(12) United States Patent
Jagannath et al.

(10) Patent No.: US 8,896,604 B2
(45) Date of Patent: Nov. 25, 2014

(54) PRODUCING OPTIMIZATION GRAPHS IN ONLINE ADVERTISING SYSTEMS

(75) Inventors: Sumanth Jagannath, Sunnyvale, CA (US); Jason Zien, Mountain View, CA (US); Javavel Shanmugasundaram, Santa Clara, CA (US); Erik Vee, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1042 days.

(21) Appl. No.: 12/697,166

(22) Filed: Jan. 29, 2010

(65) Prior Publication Data

US 2011/0187717 A1 Aug. 4, 2011

(51) Int. Cl.
*G06T 11/20* (2006.01)

(52) U.S. Cl.
CPC ..................................... *G06T 11/20* (2013.01)
USPC ............................. 345/440; 707/705; 705/1.1

(58) Field of Classification Search
None
See application file for complete search history.

(56) References Cited

U.S. PATENT DOCUMENTS

| | | | | |
|---|---|---|---|---|
| 5,559,533 A | * | 9/1996 | Hicok et al. | 345/162 |
| 6,631,413 B1 | * | 10/2003 | Aggarwal et al. | 709/226 |
| 8,078,617 B1 | * | 12/2011 | Neveitt et al. | 707/732 |
| 8,082,358 B2 | * | 12/2011 | Wang et al. | 709/232 |
| 8,155,990 B2 | * | 4/2012 | Chickering et al. | 705/7.12 |
| 2004/0225644 A1 | * | 11/2004 | Squillante et al. | 707/3 |
| 2008/0256034 A1 | * | 10/2008 | Chang et al. | 707/3 |
| 2009/0070177 A1 | * | 3/2009 | Agarwal et al. | 705/8 |
| 2011/0208559 A1 | * | 8/2011 | Fontoura et al. | 705/7.26 |
| 2011/0313807 A1 | * | 12/2011 | Envarli et al. | 705/7.22 |

OTHER PUBLICATIONS

Atsuyoshi Nakamura et al., "Improvements to the Linear Programming Based Scheduling of Web Advertisements", 2005, Electronic Commerce Research, 5:75-98.*
Aggrawal et al., "A Framework for the Optimizing of WWW Advertising", 1998, Lectures Notes in Computer Science vol. 1402 pp. 1-10.*
Lakhal et al., "Network companies and competitiveness: A framework for analysis", 1999, European Journal of Operational Research 118, p. 278-294.*

* cited by examiner

*Primary Examiner* — David Zarka
*Assistant Examiner* — David H Chu
(74) *Attorney, Agent, or Firm* — Mauriel Kapouytian Woods LLP; Andrew A. Noble; James Woods (57) ABSTRACT

A computer implemented system produces an optimization graph in an online advertising system. The system presents at a computer, a supply of advertising inventory and advertising demand contracts, where each advertising inventory is presented as a supply node and each advertising demand contract is presented as a demand node. The system processes the supply of advertising inventory and the advertising demand contracts. For example, the system partitions the supply nodes into supply partitions and determines whether each supply node is eligible for each demand node. In addition, the system determines the number of eligible supply nodes to be drawn from each supply partition for each demand node.

18 Claims, 7 Drawing Sheets

PRODUCING OPTIMIZATION GRAPHS IN ONLINE ADVERTISING SYSTEMS

BACKGROUND

1. Field

The information disclosed relates to online advertising. More particularly, the information disclosed relates to generating an optimization graph in an online advertising system.

2. Background Information

Online advertising is a form of promotion that uses the Internet and World Wide Web to deliver marketing messages on webpages to attract customers. Each webpage may include one or more locations on the page that are ready to receive an impression of an advertisement. An advertising system may refer to these as a supply of advertising inventory, which usually is made up of page impressions. In addition, the advertising system may have contractual obligations to serve a number of advertisements to the advertising inventory over a given amount of time. For example, the advertising system may be contracted to deliver two billion advertisements to webpages over thirty days. An advertising system may refer to these as advertising demand contracts.

In online advertising, a page impression should be suitable for a given advertisement. For example, a children's news webpage may be a good place to serve an advertisement for a toy, but not a good place to serve an advertisement that promotes a tobacco product. To keep track of this, the advertising system may maintain a graph that links the supply and the demand in a way that represents that allowable supply that can be used to satisfy a particular demand. However, advertising systems that process billions of impressions per day have a difficult time in handling arbitrarily large graphs representing such supply and demand.

SUMMARY

A computer implemented system produces an optimization graph in an online advertising system. The system presents at a computer, a supply of advertising inventory and advertising demand contracts, where each advertising inventory is presented as a supply node and each advertising demand contract is presented as a demand node. The system processes the supply of advertising inventory and the advertising demand contracts. For example, the system partitions the supply nodes into supply partitions and determines whether each supply node is eligible for each demand node. In addition, the system determines the number of eligible supply nodes to be drawn from each supply partition for each demand node.

DETAILED DESCRIPTION

A webpage may include multiple advertising impression locations into which an ad server may deliver advertisements. This supply of advertising inventory primarily may include such page impressions. An advertising system may have demand obligations to serve a number of advertisements to this advertising inventory supply over a given amount of time. For example, company A may have a contract with the operators of the advertising system that obligates the operators to deliver 100,000 of company A's advertisements to the supply over a seven day period.

The operators of the advertising system may have numerous advertising contracts with numerous product sellers and be in possession of numerous page impressions ready to receive advertisements. Each aspect may have its own requirements, the collective of which creates a very complex relationship. To model the two-part supply-demand structure, the advertising system may utilize a bipartite graph.

Figure 1:
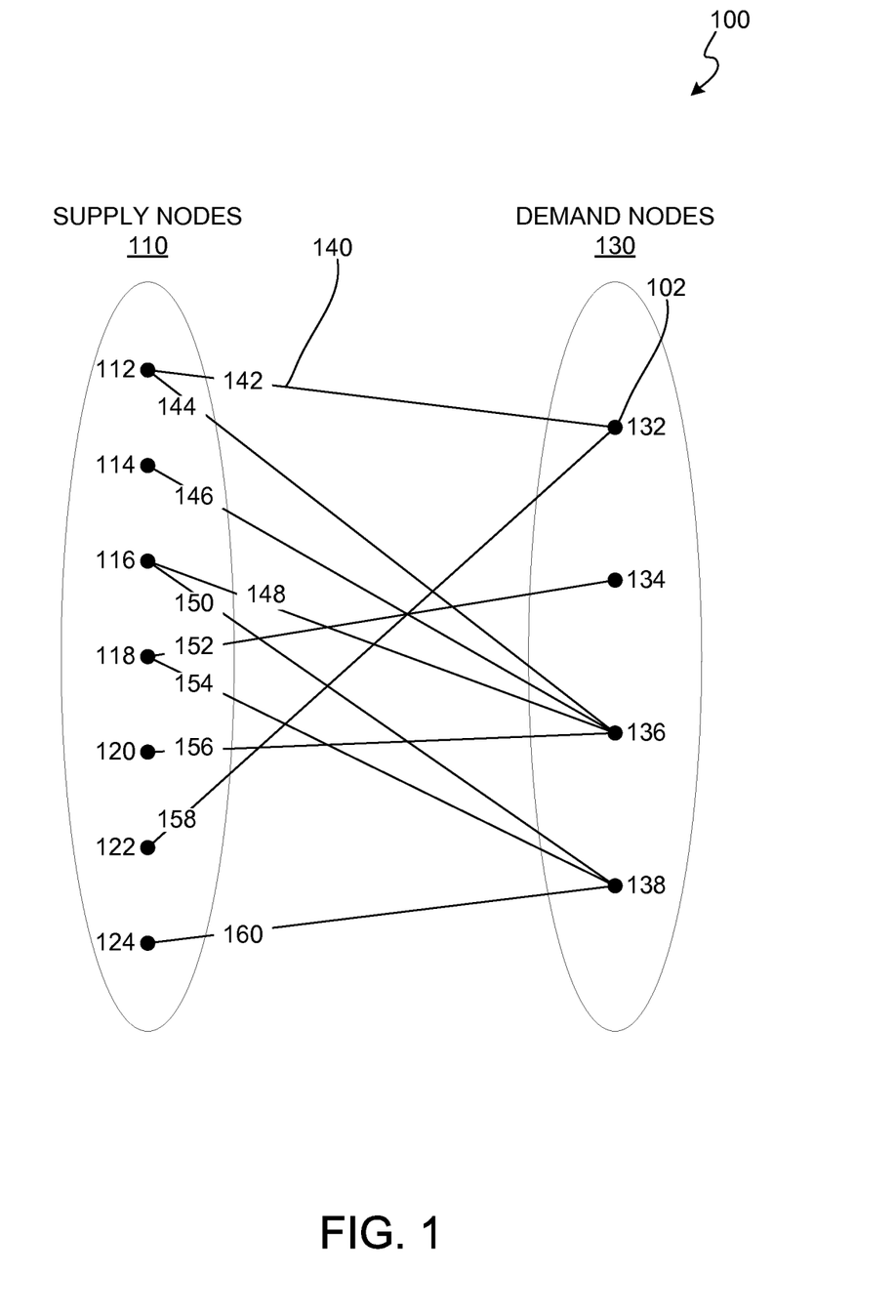
FIG. 1 is an example bipartite graph 100 for an advertising system.

FIG. 1 is an example bipartite graph 100 for an advertising system. Bipartite graph 100 may include a node set 102 consisting of all nodes in bipartite graph 100. Node set 102 may be divided into two subsets of nodes: supply nodes 110 and demand nodes 130 positioned to a side of supply nodes 110. Supply nodes 110 and demand nodes 130 have no element in common and are said to be disjoint sets.

Supply nodes 110 may be nodes that represent the supply of advertising inventory (usually page impressions). For example, supply nodes 110 may include a first page impression 112, a second page impression 114, a third page impression 116, and a fourth page impression 118, a fifth page impression 120, a sixth page impression 122, and a seventh page impression 124. Supply nodes 110 may be impressions, each having detailed attributes such as age, gender, location, interests, and page type (finance, sports, automotive, etc.).

Demand nodes 130 may represent the advertising demand contracts. For example, demand nodes 130 may include a first advertising demand contract 132, a second advertising demand contract 134, a third advertising demand contract 136, and a fourth advertising demand contract 138. The advertising demand contracts may be between advertisers and a network entity that provides online advertising services.

In online advertising, a page impression should be suitable for a given advertisement. For example, a children's news webpage may be a good place to serve an advertisement for a toy, but not a good place to serve an advertisement that promotes a tobacco product. In bipartite graph 100, first page impression 112 may be suitable for first advertising demand contract 132 and third advertising demand contract 136, but not suitable for the remaining advertising demand contracts. Second page impression 114 may be suitable for third advertising demand contract 136, but not suitable for the remaining advertising demand contracts.

To link suitable page impressions with advertising demand contracts, bipartite graph 100 may include edges 140 that connect some pairs of nodes 102 such that every edge 140 connects a node in supply nodes 110 to one in demand nodes 130. When linked between a supply node 110 and a demand node 130, edges 140 may represent the allowable supply that can be used to satisfy the demand. Edges 140 may include edges 142-160, where an example allowable supply 110 that can be used to satisfy the demand 130 is illustrated in FIG. 1 through node connections by edges 142-160.

At any given time, bipartite graph 100 may include billions of supply nodes 110, demand nodes 130, and edges 140 representing huge volumes of supply and demand. Advertising systems that process billions of impressions per day have a difficult time in handling such an arbitrarily large graph. To address this, the following describes a computer-implemented system to produce an optimization graph on a distribute system that takes advantage of the distributed system. The optimization graph consists of nodes and edges that form a bipartite graph and may handle changing amounts of supply or demand in a graceful, efficient manner and may be readily enlarged or reduced in response to changing amounts of work. Here, the disclosed method is built on top of a map-reduce distributed programming infrastructure to provide a scalable way for easy handling of extremely large graphs due to its distributed computations. Importantly, the entire graph is never kept in memory. The maximum in-memory state is the supply nodes, demand nodes, and the edges for one demand node.

General Online Advertising

In the following description, numerous details are set forth for purpose of explanation. However, one of ordinary skill in the art will realize that a skilled person may practice the methods without the use of the specific details. In other instances, the disclosure may show well-known structures and devices in block diagram form to prevent unnecessary details from obscuring the written description.

Advertisers may desire to present advertisements to viewers of webpages to promotion of some product or service. To raise money as an ongoing business, a network entity operating an advertising system may enter into advertising demand contracts whereby the network entity obligates itself to use its advertising system to deliver a number of advertisements to its advertising inventory over a given amount of time. To meet the advertising demand contracts, the network entity may acquire a supply of advertising inventory. In general, supply may the amount of advertising inventory available for a price at any given time in an advertising system. Demand may reflect the number of advertisements that the advertising system is contractually obligated to serve to the advertising inventory that is in supply. Before discussion how to produce an optimization graph on a distribute system to model the two-part supply-demand structure, it may be helpful to describe the acquisition of both the supply and the demand by the advertising system.

Figure 2:
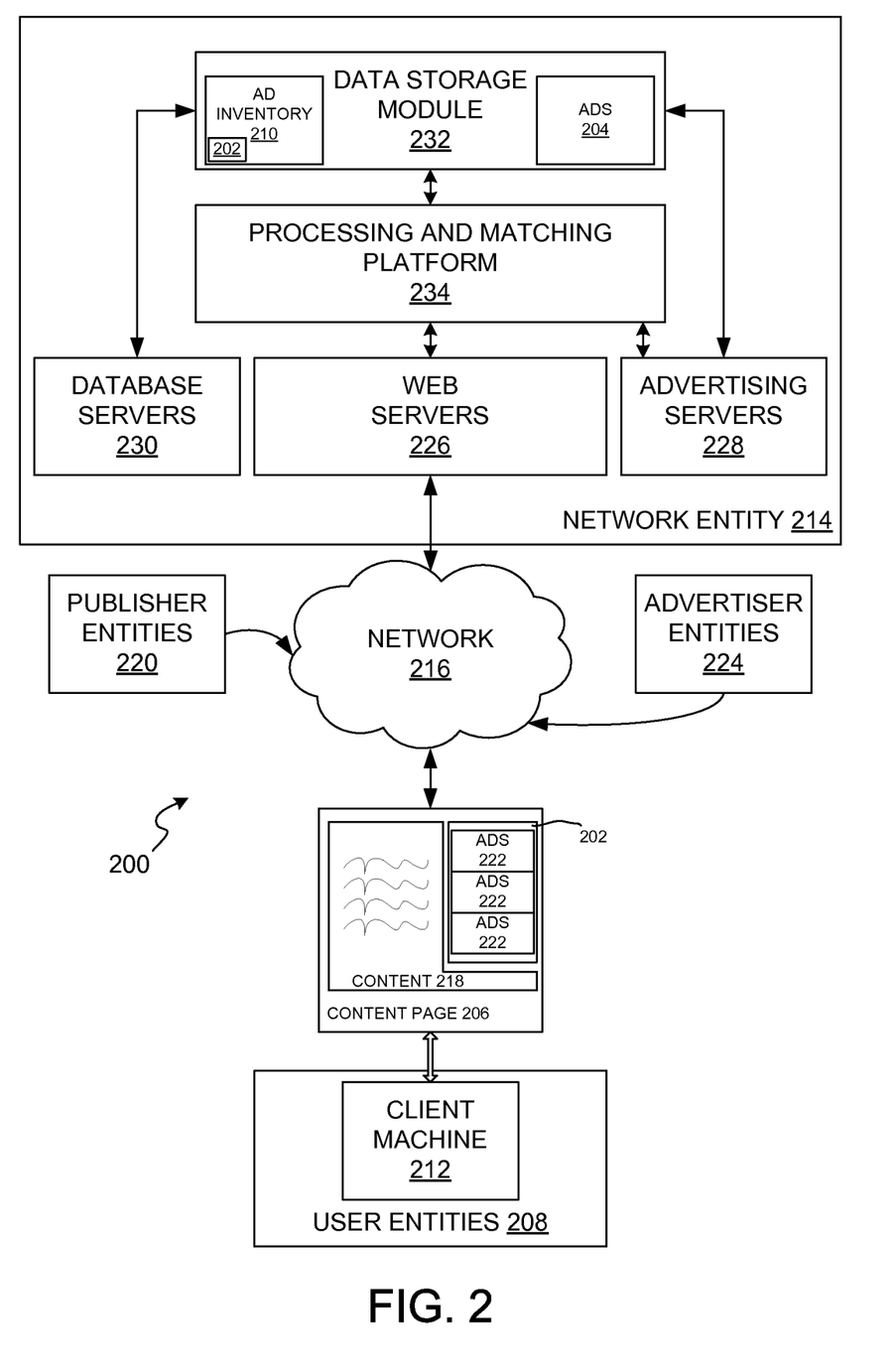
FIG. 2 is a block diagram illustrating a system 200.

FIG. 2 is a block diagram illustrating a system 200. A request to place an advertisement on a webpage may be thought of as a page impression opportunity 202. System 200 may be a group of independent but interrelated elements that may work to acquire page impressions 202 and to place advertisements 204 on a webpage 206 in those page impressions 202 for viewing by a user 208. System 200 may place each page impression 202 into an advertising inventory 210, where advertising inventory 210 contains the supply of ad spaces available for sale by system 200 during a certain time frame.

In the examples described below, users 208 may employ a client machine 212 to access a network entity 214, such as, for example, a content service-provider, over a network 216 such as the Internet and further input various data, which system 200 subsequently may capture by selective processing modules within the network-based entity 214. User 208 input typically comprises "events." In one example, an event may be a type of action initiated by user 214, typically through a conventional mouse click command. Events include, for example, advertisement clicks, search queries, search clicks, sponsored listing clicks, page views, and advertisement views. However, events, as used herein, may include any type of online navigational interaction or search-related events.

Each such event initiated by user 208 may trigger a transfer of content information to user 208 from network 216. User 208 may see the displayed content information typically in the form of a webpage 206 on the user's client computer 212. Webpage 206 may incorporate content 218 provided by publishers 220, where content 218 may include, for example, articles, and/or other data of interest to users displayed in a variety of formats. In addition, webpage 206 also may incorporate advertisements 204 as displayed advertisements 222 provided on behalf of various advertisers 224 over network 216 such as by an advertising agency. The advertising agency may be included within network entity 214, or in an alternative, system 200 may link network entity 214, advertisers 224, and the advertising agency, for example.

System 200 may be a structure having exemplar/network-based network entity 214 connected to user entities 208, publisher entities 220, and advertiser entities 224 through network 216. To satisfy some demand with supply, each may cooperate to deliver content page 206 having content 218 and advertisements 222 to user 208. Network entity 214 may communicate through network 216. In one example, network entity 214 may be a network content service provider, such as, for example, Yahoo!™ and its associated properties.

Network entity 214 may be a device that has a distinct, separate existence and includes an autonomous computer that performs calculations automatically. For example, network entity 214 may include front-end web processing servers 226, which may, for example, deliver content pages 206 and other markup language documents to multiple users, and/or handle search requests to network entity 214. In addition to web processing servers 226, network entity 214 may include processing servers to provide an intelligent interface to the back-end of network entity 214. For example, network entity 214 may include back-end servers such as advertising servers 228, and database servers 230.

Each server of network entity 214 may maintain and facilitate access to data storage modules 232. Data storage modules 232 may contain advertisements 204 and advertising inventory 210 configured to receive one or more ads from advertisements 204. In one example, advertising servers 228 may be coupled to data storage module 232 and may transmit and receive advertising content, such as, for example, advertisements, sponsored links, integrated links, and other types of advertising content, to/from advertiser entities 224 via network 216. Network entity 214 further may include a processing and matching platform 234 coupled to data storage module 232. Processing and matching platform 234 may enable matching of page content 218 to related advertisements in advertisements 204, such as through a semantic matching engine that supports contextual advertising. A goal of a contextual advertising may be to place advertisements 204 on webpage 206 that are related to content 218 to provide a good experience for user 208. System 200 may connect processing and matching platform 234 to web servers 226, advertising servers 228, and data storage module 232.

Advertisements 204 may be supplied to network entity 214 by advertiser entities 224 through contractual agreement. For example, a guaranteed contract may obligate network entity 214 to match advertisements from advertiser entities 224 to opportunities on a guaranteed quantity/time basis. A nonguaranteed contract may obligate network entity 214 to match advertisements from advertiser entities 224 to opportunities should certain preconditions be met. As an impression delivery promisor, network entity 214 may have a system to create an impression supply. For example, network entity 214 may create webpage content 218 that attracts users 208 to that webpage content 218. When a user 208 requests a particular webpage 206 belonging to network entity 214, the event may create an impression opportunity 202. When impression opportunity 202 is generated from a system maintained by network entity 214, then network entity 214 may be thought of as a publisher. Alternatively, network entity 214 may obtain impression opportunities from others as an advertisement agent.

In a typical days operation, user entities 208 may request billions of webpages 206, each of which may contain one or more page impression opportunities 202. These page impression opportunities 202 may be collected as supply of advertising inventory 210. This supply may be utilized to satisfy the billions of advertising demands placed on network entity 214 through advertising demand contracts.

Data Partitioning Strategies

As noted, bipartite graph 100 may include billions of supply nodes 110, demand nodes 130, and edges 140 at any given time. As an arbitrarily large graph, bipartite graph 100 represents huge volumes of supply and demand. Here, advertising system 100 may have a difficult time in handling such an arbitrarily large graph. To address this, system 100 may produce an optimization graph on a distributed system.

System 100 may take three approaches to setup the data required to produce an optimization graph on a distributed system. In a first approach, system 100 may partition supply nodes 110 and replicate demand nodes 130 in its entirety for each supply partition. In a second approach, system 100 may partition demand nodes 130 and replicate supply nodes 110 in its entirety for each demand partition. In a third, hybrid approach, system 100 may partition supply nodes 110 and replicate K supply nodes 110 while partitioning demand nodes 130 K ways.

Partitioning supply and replicating demand makes sense whenever network entity 214 includes a large pool of page impressions 202 in advertising inventory 210. In other words, when the supply data is very large compared to demand, partitioning supply and replicating demand may provide an efficient and scalable way to construct the desired optimizer graph. A disadvantage to this strategy is that the produced optimizer graph scales linearly with increased demand.

Partitioning demand and replicating supply makes sense whenever network entity 214 includes a small pool of page impressions 202. In other words, when the supply data is small, system 100 first can replicate the entire supply to each map node of the optimizer graph and then partition the demand. However, a successful network entity 214 generally may include a supply data size that is many orders greater than the demand node size such that partitioning demand and replicating supply generally may be less useful for larger network entities. In addition, this approach may require increased network bandwidth. The hybrid approach is a way for system 100 to address the need to increase network bandwidth when partitioning demand and replicating supply.

In the hybrid approach, system 100 may partition supply nodes 110 and replicate K number of supply nodes 110 while partitioning demand nodes 130 K number of ways. An advantage of soft-partitioning both supply and demand is that system 100 can scale with increased demand. However, while a need to increase network bandwidth is decreased compared to the partitioning demand and replicating supply strategy, the hybrid approach still requires increased network bandwidth in comparison to the first approach of partitioning supply and replicating demand.

Partitioning Supply and Replicating Demand

To setup the data required to produce an optimization graph on a distributed system, system 100 may partition supply and replicate demand. Here, each supply partition gets the entire demand nodes 130 and results in a sub-graph corresponding to its supply and the entire demand nodes 130. Importantly, system 100 must supply a unified view of the supply so that the demand sees all of the supply.

The approach may include two (or optionally three) distinct passes. First, system 100 may obtain supply node samples such as from supply nodes 110. These supply node samples may represent the actual availably for the demand node, independent of contention such as traffic interference, multiple demands, and other situations where the availability of the supply node is in dispute. Then, system 100 may determine whether a supply node sample drawn for a first demand node also is eligible for a second demand node. System 100 additionally may do a union to union of the entire supply in supply nodes 110 for each demand node 130.

Figure 3:
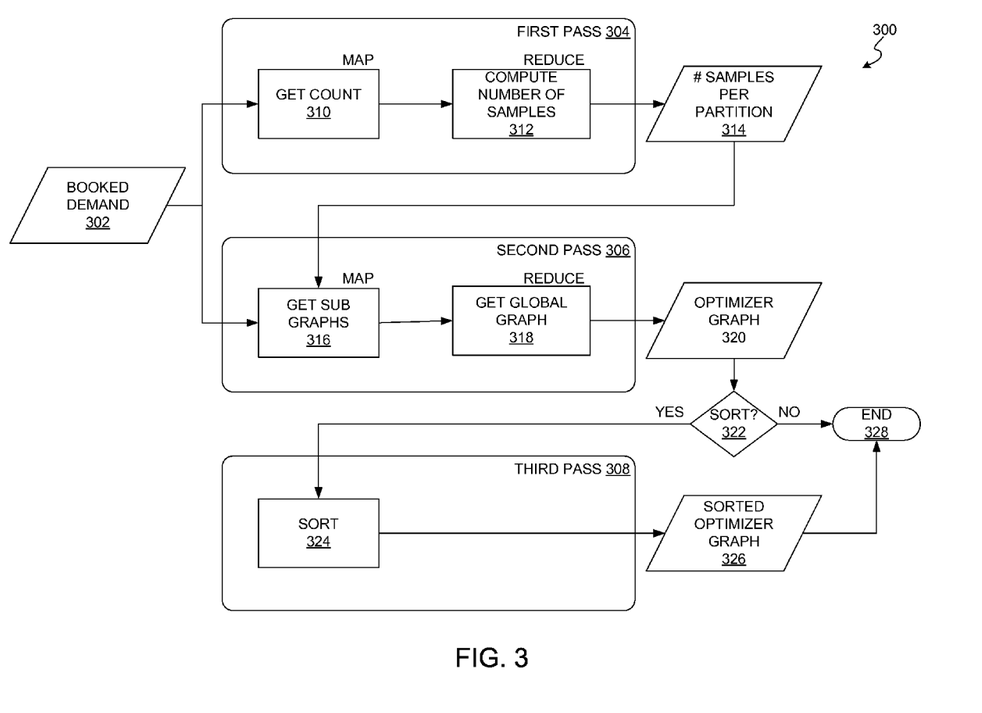
FIG. 3 is a block diagram illustrating a system 300 to produce an optimizer graph.
Figure 4:
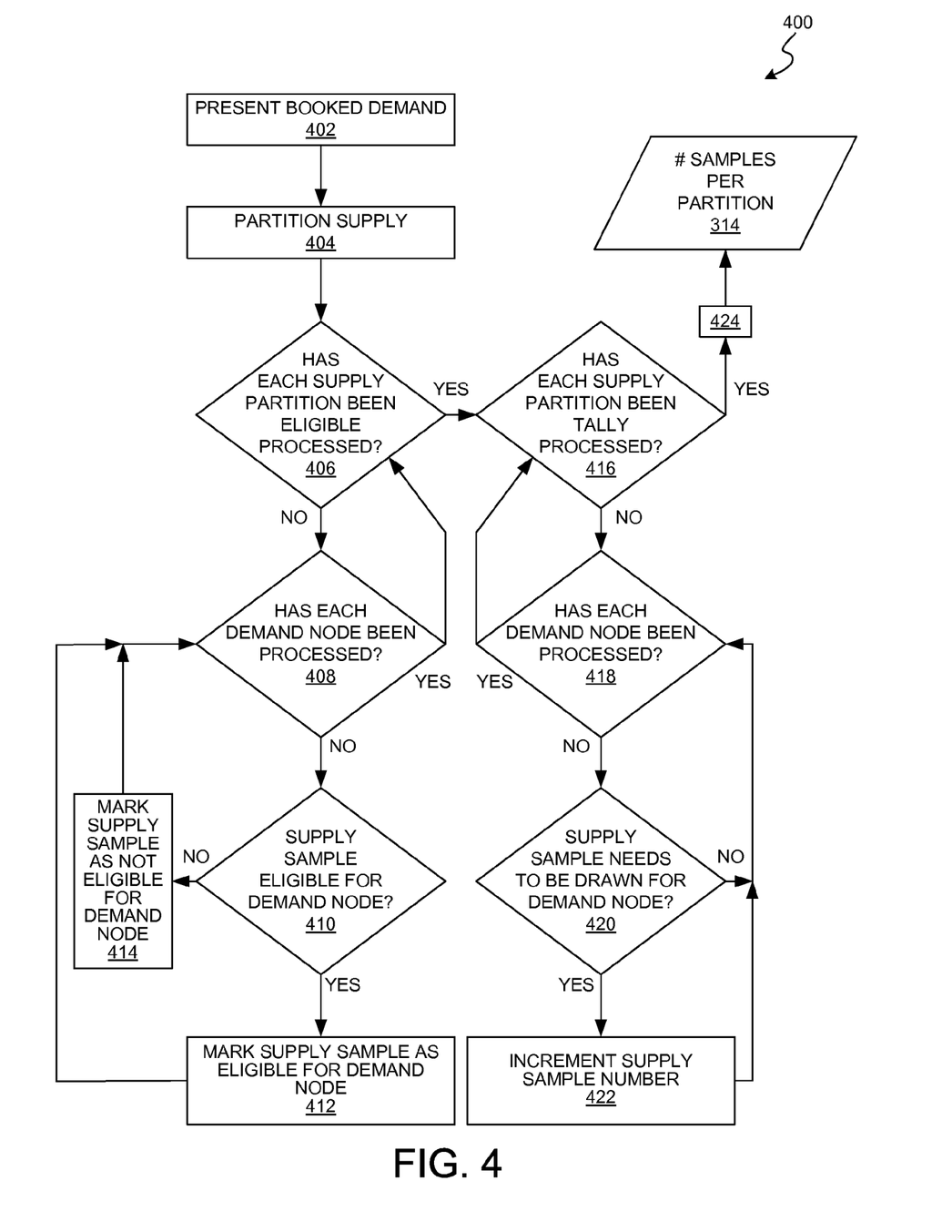
FIG. 4 is a flow diagram illustrating a method 400 to output a number of samples per partition data 314 utilizing first pass function 304.

FIG. 3 is a block diagram illustrating a system 300 to produce an optimizer graph. System 300 may include booked demand data 302, a first pass function 304, a second pass function 306, and a third pass function 308, each connected with each other. FIG. 4 is a flow diagram illustrating a method 400 to output a number of samples per partition data 314 utilizing first pass function 304. Both system 300 and method 400 may be implemented utilizing system 200 of FIG. 2.

Booked demand data 302 may reflect the number of advertisements reserved in advance that network entity 214 is contractually obligated to serve to supply of advertising inventory 210. First pass function 304 and second pass function 306 each may be map-reduce functions, where the mapping process works to associate each element of a given set with an element of another set and the reduce process works to process a data structure and build up a return value. Third pass function may work to sort data output by predetermined criteria utilizing a sort process.

First pass function 304 may include a get count process 310 to receive booked demand data 302 and include a compute number samples process 312 connected to get count process 310. First pass function 304 may output number of samples per partition data 314. Second pass function 306 may include a get sub graphs process 316 to receive both booked demand data 302 and number of samples per partition data 314. Second pass function 306 also may include a get global graph process 318 connected to get sub graphs process 316. Second pass function 306 may output an optimizer graph. Third pass function 308 may include a sort function 324 to optionally further process optimizer graph and output a sorted optimizer graph 326.

Figure 5:
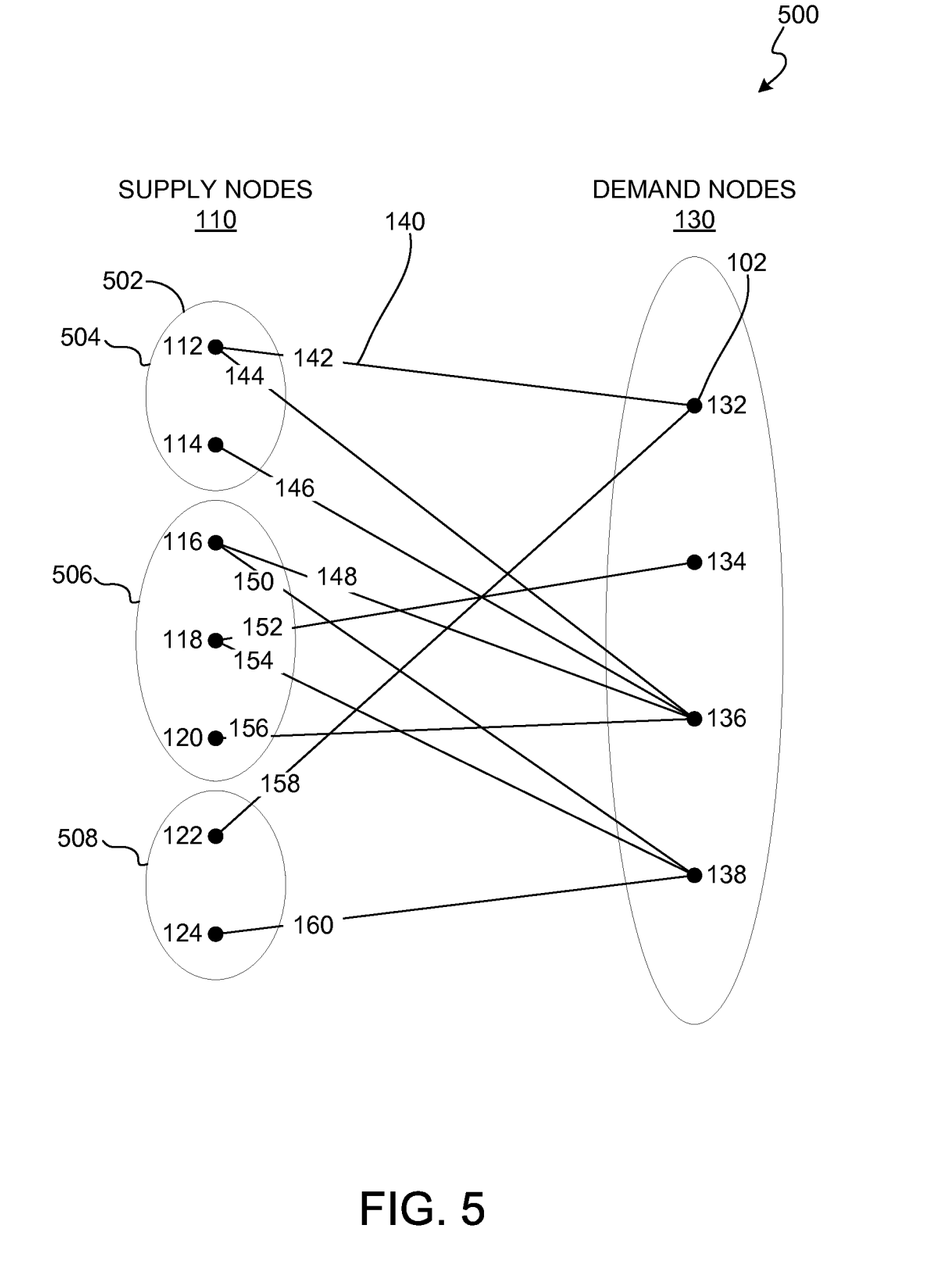
FIG. 5 is an example partition 500 of supply nodes.

At processing block 402, method 400 may present booked demand data 302. In an example, system 300 may be presented with 100,000 advertising demand contracts. At processing block 404, method 400 may divide supply into a plurality of supply partitions. For example, each page impression opportunity 202 (FIG. 2) in advertising inventory 210 may be represented by a node in supply nodes 110 (FIG. 5). System 300 may partition supply nodes 110 into a two or more supply partitions, where each supply partition includes page impression opportunities as one or more supply samples. FIG. 5 is an example partition 500 of supply nodes. In the example of FIG. 5, system 300 may partition supply nodes 110 into three supply partitions 502: supply partition 504 containing supply node/samples 112, 114, supply partition 506 containing supply samples 116, 118, 120, and supply partition 508 containing supply samples 122, 124. In another example, 200,000,000 impressions 110 may be partitioned into 50 groups 502, with each group containing 4,000,000 impressions.

At processing block 406, method 400 may determine whether each supply partition 504, 506, 598 has been eligible processed. Processing each supply partition 502 at processing block 406 includes determining whether each supply sample 110 of each supply partition 502 is eligible for each demand node 130. Processing each supply partition by mapping all of supply 110 to each demand node 130 provides a unified view of the supply, even though supply 110 is partitioned. If each supply partition 502 has been processed, method 400 may proceed to processing block 416 to begin reduction. If each supply partition has not been processed, method 400 may proceed to processing block 408 to process a supply partition.

At processing block 408, method 400 may determine whether each demand node 130 has been processed. If each demand node 130 has been processed, then method 400 may return to processing block 406. If each demand node 130 has not been processed, then method 400 may proceed to processing block 410.

At processing block 410, method 400 may determine whether a supply sample 110 of a given supply partition 502 is eligible for a particular demand node 130. For example, system 300 may utilize get count process 310 (FIG. 3) to determine whether first page impression 112 of first supply partition 502 is a relevant to or a good match for each advertisement represented by demand nodes 132, 134, 136, and 138 as input through booked demand 302. In other words, system 300 may determine which of the given supply of impressions meet parameter criteria for a given contract. For example, if the advertising contract 130 requires advertisements directed to a California market, system 300 may screen supply nodes 110 for impressions related to California.

In the example of FIG. 5, first page impression 112 is available for demand node 132 and demand node 136. If a supply sample is eligible for a particular demand node 130, method 400 may identify that supply sample as available for that particular demand node at processing block 412 and method 400 may return to processing block 408. In the example, first page impression 112 would be identified as available for demand node 132 and demand node 136 and its position in the first supply partition 504 is known. If a supply sample is not eligible for a particular demand node 130, method 400 may identify that supply sample as not available for that particular demand node at processing block 414 and method 400 may return to processing block 408. Table I below illustrates binary eligibility identification for the example of FIG. 5:

TABLE I

| Supply partition | Supply sample | Demand node 132 | Demand node 134 | Demand node 136 | Demand node 138 |
|---|---|---|---|---|---|
| 504 | 112 | 1 | 0 | 1 | 0 |
|  | 114 | 0 | 0 | 1 | 0 |
| 506 | 116 | 0 | 0 | 1 | 1 |
|  | 118 | 0 | 1 | 0 | 1 |
|  | 120 | 0 | 0 | 1 | 0 |
| 508 | 122 | 1 | 0 | 0 | 0 |
|  | 124 | 0 | 0 | 0 | 1 |

As noted, if each supply partition 502 has been processed, method 400 may proceed from processing block 406 to processing block 416 to begin reduction. At processing block 416, method 400 may determine whether each supply partition 504, 506, 598 has been tally processed. Processing each supply partition 502 at processing block 416 includes finding the number of samples of the supply nodes that need to be drawn from each supply partition 502 for each demand node 130. If each supply partition 502 has been processed, method 400 may proceed to processing block 424 to output samples per partition data 314 as the number of samples of the supply nodes that need to be drawn from each supply partition 502 for each demand node 130. If each supply partition has not been processed, method 400 may proceed to processing block 418 to process a supply partition.

At processing block 418, method 400 may determine whether each demand node 130 has been processed. If each demand node 130 has been processed, then method 400 may return to processing block 416. If each demand node 130 has not been processed, then method 400 may proceed to processing block 420.

At processing block 420, method 400 may determine whether a supply sample 110 of a given supply partition 502 needs to be drawn from that supply partition 502 for a particular demand node 130. For example, system 300 may utilize compute number samples process 312 (FIG. 3) to determine the number of supply nodes within supply partition 504 need to be drawn for demand nodes 132, 134, 136, and 138 using data received from get count process 310. In the example of FIG. 5, first page impression 112 of supply partition 504 needs to be drawn for demand node 132. In addition, both first page impression 112 and second page impression 114 of supply partition 504 need to be drawn for demand node 136. Further, neither first page impression 112 nor second page impression 114 need to be drawn for any of the remaining demand nodes.

If a supply sample needs to be drawn from a particular supply partition 502 for a particular demand node 130, method 400 may increment by one the number of supply samples that need to be drawn from that supply partition 502 for the noted demand node 130 at processing block 420 and method 400 may return to processing block 418. In the example, the number of supply samples that need to be drawn from that supply partition 504 is one for demand node 132, two for demand node 136, and zero for demand node 134 and 138. If a supply sample does not need to be drawn from a particular supply partition 502 for a particular demand node 130, method 400 may return to processing block 418. Table II below illustrates supply node quantification for the example of FIG. 5:

TABLE II

| Supply partition | Demand node 132 | Demand node 134 | Demand node 136 | Demand node 138 |
|---|---|---|---|---|
| 504 | 1 | 0 | 2 | 0 |
| 506 | 0 | 1 | 2 | 2 |
| 508 | 1 | 0 | 0 | 1 |

As noted, if each supply partition 502 has been processed, method 400 may proceed to processing block 424 and output samples per partition data 314. Samples per partition data 314 may represent the number of supply samples per partition 502 that need to be drawn from each supply partition 502 for each demand node 130. In first pass function 304, a map-reduce program may use a "GetCount" routine to get the count of the number of samples needed from each partition. A key idea here is that even though supply is partitioned, system 300 provides a unified view of the supply. System 300 may pick a supply sample 110 from a supply partition 502 with higher probability if it has higher GetCount for a certain demand-node 130.

With system 300 processed through first pass function 304, the data of book demand 302 and number of samples per partition 314 may be processed through second pass function 306. A purpose of this is to generate an optimization graph.

System 300 optionally may process the optimization graph through third pass function 308 to sort the output graph by some criteria.

Figure 6:
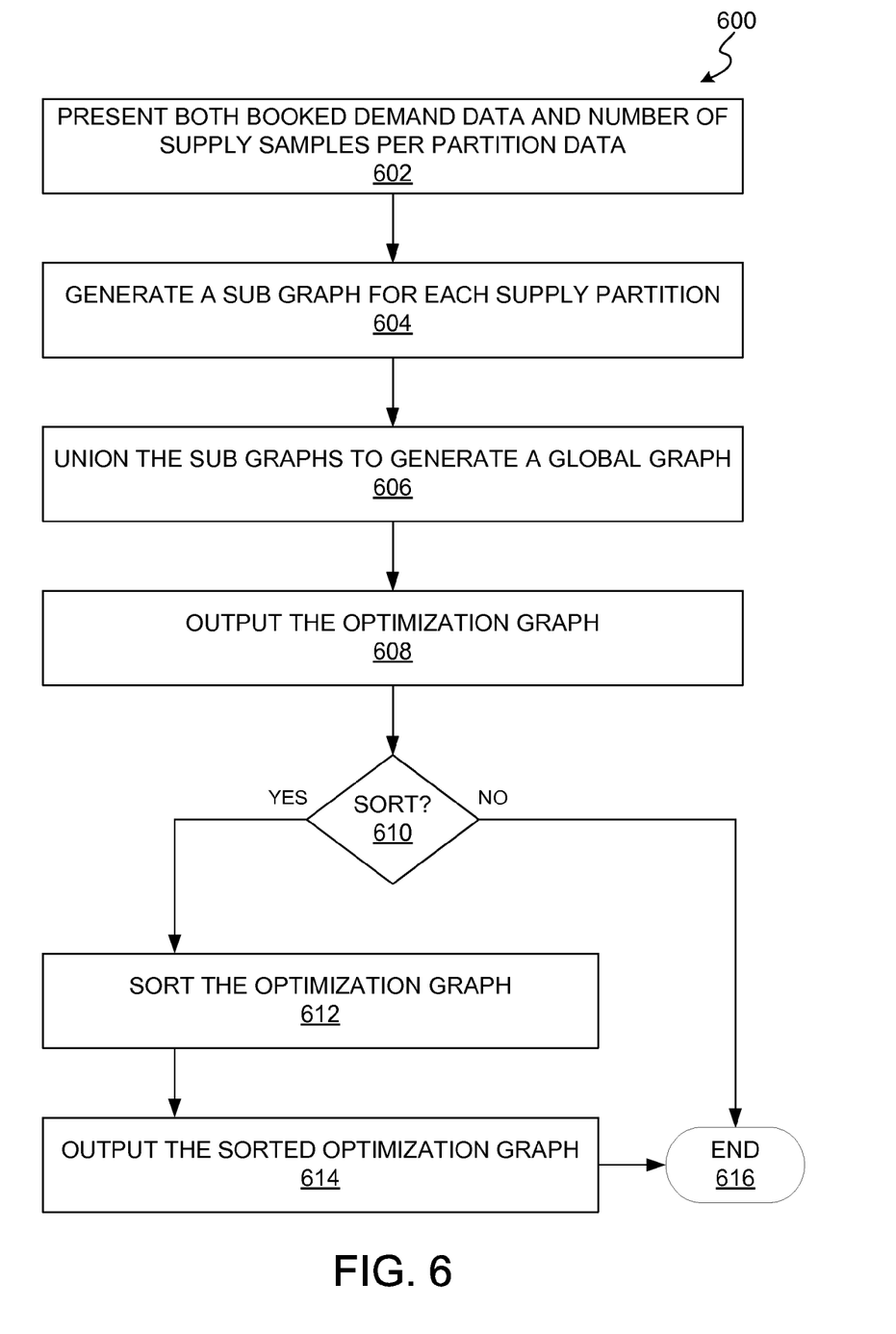
FIG. 6 is a flow diagram illustrating a method 600 to output an optimization graph utilizing data from first pass function 304 utilizing system 300.

FIG. 6 is a flow diagram illustrating a method 600 to output an optimization graph utilizing data from first pass function 304 utilizing system 300. Method 600 may be performed utilizing a map-reduce program. At processing block 602, method 600 may present book demand data 302 and number of samples per partition data 314. As noted, booked demand data 302 may reflect the number of advertisements reserved in advance that network entity 214 is contractually obligated to serve to supply of advertising inventory 210. Number of samples per partition data 314 reflects the number of supply samples 110 that need to be drawn from a particular supply partition 502 for a given demand-node 130 such as obtained through method 400.

At processing block 604, method 600 may generate a sub graph for each supply partition 502. System 300 may utilize sub graphs process 316 in a map phase to generate the sub graphs based on number of samples per partition data 314 from first pass function 304. Importantly, each sub graph will be a partitioned graph since system 300 partitioned supply nodes 110 into a two or more supply partitions at processing block 404 of method 400. Since the sub graphs are partitioned, system 300 will not produce duplicate arcs among edges 140 and the graph-union operation in the reduce phase of second pass function 306 becomes relatively straightforward. Moreover, in generating/constructing the sub graphs, the entire sub-graph is never kept in memory. In particular, the total arcs 140 are never kept in memory and only the samples of the supply and demand nodes 130 need be kept in memory. After processing a demand node 130, system 300 may output that demand-node and the corresponding edges for that demand node.

At processing block 606, method 600 may union the sub graphs to generate a global graph. By joining the data of the sub graphs into a single graph in the reduce phase, the global graph may represent a current view of a system containing supply nodes 110, demand nodes 130, and edges 140. At processing block 608, method 600 may output the optimization graph 320.

At processing block 610, method 600 may determine whether to sort the output graph 320 by some criteria. For example, system 300 may receive a request to sort contracts 130 for optimization graph 320 by priority, or any other parameter. If method 600 determines to sort the optimization graph 320 according to predetermined criteria, then method 600 may sort optimization graph 320 by that criteria in third pass function 308 utilizing sort program 324 at processing block 612 to output a sorted optimization graph 326 at processing block 614, and end at processing block 616. If method 600 determines to not sort the optimization graph 320 according to predetermined criteria, method 600 may end at processing block 614.

The disclosed systems and methods to generate an optimization graph in an online advertising system allows for easy handling of extremely large graphs due to its distributed computations. Importantly, the entire graph is never kept in memory. The maximum in-memory state is the supply nodes, demand nodes, and the arcs for one demand node. In addition, the system may be scale with increased supply or demand since either or both supply and demand may be partitioned/replicated.

Figure 7:
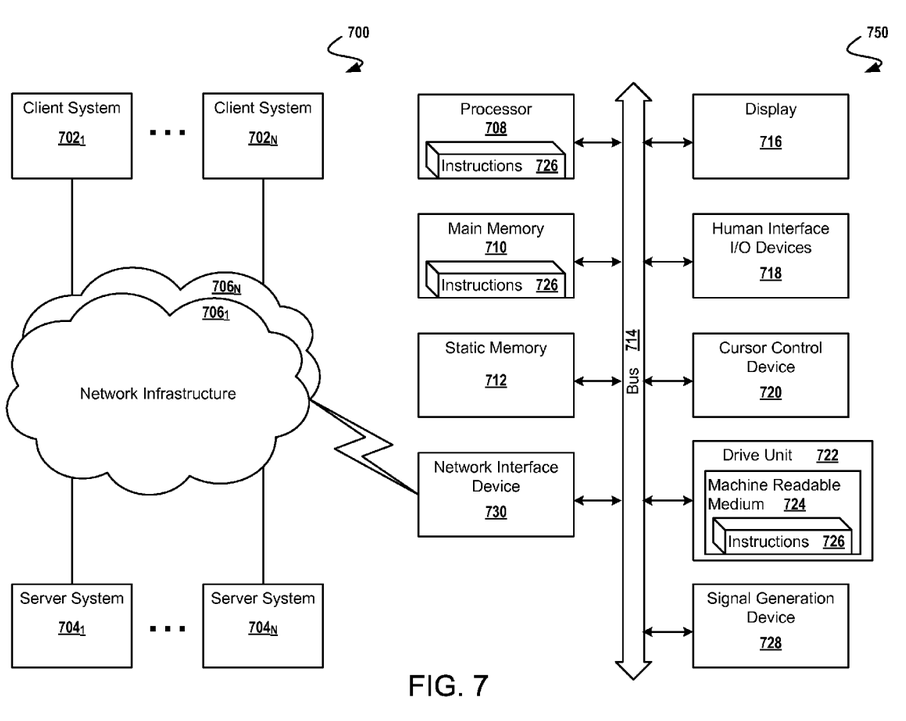
FIG. 7 is a diagrammatic representation of a network 700.

FIG. 7 is a diagrammatic representation of a network 700. Network 100 may include nodes for client computer systems $702_1$ through $702_N$, nodes for server computer systems $704_1$ through $704_N$, and nodes for network infrastructure $706_1$ through $706_N$. Any of these notes or combination thereof may comprise a machine 750 within which a set of instructions for causing the machine to perform any one of the techniques discussed above may be executed. The embodiment shown is purely exemplary, and might be implemented in the context of one or more of the figures herein.

Any node of the network 700 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A system also may implement a processor as a combination of computing devices (e.g., a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems, a massively parallel computer system, and/or a cloud computer system.

The computer system 750 includes a processor 708 (e.g., a processor core, a microprocessor, a computing device, etc), a main memory 710 and a static memory 712, which communicate with each other via a bus 714. The machine 750 may further include a display unit 716 that may comprise a touchscreen, or a liquid crystal display (LCD), or a light emitting diode (LED) display, or a cathode ray tube (CRT). As shown, the computer system 750 also includes a human input/output (I/O) device 718 (e.g., a keyboard, an alphanumeric keypad, etc), a pointing device 720 (e.g., a mouse, a touch screen, etc), a drive unit 722 (e.g., a disk drive unit, a CD/DVD drive, a tangible computer readable removable media drive, an SSD storage device, etc), a signal generation device 728 (e.g., a speaker, an audio output, etc), and a network interface device 730 (e.g., an Ethernet interface, a wired network interface, a wireless network interface, a propagated signal interface, etc).

The drive unit 722 includes a machine-readable medium 724 on which is stored a set of instructions (i.e., software, firmware, middleware, etc) 726 embodying any one, or all, of the methodologies described above. The set of instructions 726 also may reside, completely or at least partially, within the main memory 710 and/or within the processor 708. The network bus 714 of the network interface device 730 may provide a way to further transmit or receive the set of instructions 726.

A computer may include a machine to perform calculations automatically. A computer may include a machine that manipulates data according to a set of instructions. In addition, a computer may include a programmable device that performs mathematical calculations and logical operations, especially one that can process, store and retrieve large amounts of data very quickly.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; electrical, optical, acoustical, or any other type of media suitable for storing information.

A computer program product on a storage medium having instructions stored thereon/in may implement part or all of the systems described herein. The system may use these instructions to control, or cause, a computer to perform any of the processes. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Storing may involve putting or retaining data in a memory unit such as a storage medium. Retrieving may involve locating and reading data from storage. Delivering may involve carrying and turning over to the intended recipient. For example, information may be stored by putting data representing the information in a memory unit, for example. The system may store information by retaining data representing the information in a memory unit, for example. The system may retrieve the information and deliver the information downstream for processing. The system may retrieve a message such as an advertisement from an advertising exchange system, carried over a network, and turned over to a member of a target-group of members.

Stored on any one of the computer readable medium, the systems described herein may include software both to control the hardware of a general purpose/specialized computer or microprocessor and to enable the computer or microprocessor to interact with a human consumer or other mechanism utilizing the results of the described systems. Such software may include without limitation device drivers, operating systems, and user applications. Ultimately, such computer readable medium further may include software to perform the described systems.

Although the system may utilize the techniques in the online advertising context, the techniques also may be applicable in any number of different open exchanges where the open exchange offers products, commodities, or services for purchase or sale. Further, many of the features described herein may help data buyers and others to target users in audience segments more effectively. However, while data in the form of segment identifiers may be generally stored and/or retrieved, examples of the invention preferably do not require any specific personal identifier information (e.g., name or social security number) to operate.

The techniques described herein may be implemented in digital electronic circuitry, or in computer hardware, firmware, software recorded on a computer-readable medium, or in combinations of them. The system may implement the techniques as a computer program product, i.e., a computer program tangibly embodied in an information carrier, including a machine-readable storage device, for execution by, or to control the operation of, data processing apparatus, e.g., a programmable processor, a computer, or multiple computers. Any form of programming language may convey a written computer program, including compiled or interpreted languages. A system may deploy the computer program in any form, including as a stand-alone program or as a module, component, subroutine, or other unit recorded on a computer-readable medium and otherwise suitable for use in a computing environment. A system may deploy a computer program for execution on one computer or on multiple computers at one site or distributed across multiple sites and interconnected by a communication network.

A system may perform the methods described herein in programmable processors executing a computer program to perform functions disclosed herein by operating on input data and generating output. A system also may perform the methods by special purpose logic circuitry and implement apparatus as special purpose logic circuitry special purpose logic circuitry, e.g., an FPGA (field programmable gate array) or an ASIC (application-specific integrated circuit). Modules may refer to portions of the computer program and/or the processor/special circuitry that implements that functionality. An engine may be a continuation-based construct that may provide timed preemption through a clock that may measure real time or time simulated through language like scheme. Engines may refer to portions of the computer program and/or the processor/special circuitry that implements the functionality. A system may record modules, engines, and other purported software elements on a computer-readable medium. For example, a processing engine, a storing engine, a retrieving engine, and a delivering engine each may implement the functionality of its name and may be recorded on a computer-readable medium.

Processors suitable for the execution of a computer program include, by way of example, both general and special purpose microprocessors, and any processors of any kind of digital computer. Generally, a processor may receive instructions and data from a read-only memory or a random access memory or both. Essential elements of a computer may be a processor for executing instructions and memory devices for storing instructions and data. Generally, a computer also includes, or may be operatively coupled to receive data from or transfer data to, or both, mass storage devices for storing data, e.g., magnetic, magneto-optical disks, or optical disks. Information carriers suitable for embodying computer program instructions and data include all forms of non-volatile memory, including by way of example semiconductor memory-devices, e.g., EPROM, EEPROM, and flash memory devices; magnetic disks, e.g., internal hard disks or removable disks; magneto-optical disks; and CD-ROM and DVD-ROM disks. A system may supplement a processor and the memory by special purpose logic circuitry and may incorporate the processor and the memory in special purpose logic circuitry.

To provide for interaction with a user, a skilled person may implement the techniques described herein on a computer. The computer may have a display device, e.g., a CRT (cathode ray tube) or LCD (liquid crystal display) monitor, to display information to the user and a keyboard and a pointing device, e.g., a mouse or a trackball. The user may provide input via these devices to the computer (e.g., interact with a user interface element, for example, by clicking a button on such a pointing device). Other kinds of devices may be used to provide for interaction with a user as well; for example, feedback provided to the user includes any form of sensory feedback, e.g., visual feedback, auditory feedback, or tactile feedback; and input from the user may be received in any form, including acoustic, speech, or tactile input.

The techniques described herein may be implemented in a distributed computing system that includes a back-end component, e.g., as a data server, and/or a middleware component, e.g., an application server, and/or a front-end component, e.g., a client computer having a graphical user interface and/or a Web browser through which a user interacts with an implementation of the invention, or any combination of such back-end, middleware, or front-end components. A system may interconnect the components of the system by any form or medium of digital data communication, e.g., a communication network. Examples of communication networks include a local area network ("LAN") and a wide area network ("WAN"), e.g., the Internet, and include both wired and wireless networks.

The computing system may include clients and servers. A client and server may be generally remote from each other and typically interact over a communication network. The relationship of client and server arises by virtue of computer programs running on the respective computers and having a client-server relationship to each other. One of ordinary skill recognizes any or all of the foregoing implemented and described as computer readable media.

In the above description, numerous details have been set forth for purpose of explanation. However, one of ordinary skill in the art will realize that a skilled person may practice the invention without the use of these specific details. In other instances, the disclosure may present well-known structures and devices in block diagram form to avoid obscuring the description with unnecessary detail. In other words, the details provide the information disclosed herein merely to illustrate principles. A skilled person should not construe this as limiting the scope of the subject matter of the terms of the claims. On the other hand, a skilled person should not read the claims so broadly as to include statutory and nonstatutory subject matter since such a construction is not reasonable. Here, it would be unreasonable for a skilled person to give a scope to the claim that is so broad that it makes the claim non-statutory. Accordingly, a skilled person is to regard the written specification and figures in an illustrative rather than a restrictive sense. Any limitations claimed are disclosed for each embodiment in the description. Moreover, a skilled person may apply the principles disclosed to achieve the advantages described herein and to achieve other advantages or to satisfy other objectives, as well.

What is claimed is:

1. A computer-implemented method to produce an optimization graph in an online advertising system, the method comprising:
   at a server comprising a processor and a memory:
      presenting a supply of advertising inventory and advertising demand contracts, wherein each page impression of the advertising inventory is presented as a supply node and each advertising demand contract is presented as a demand node; and
      processing the supply of advertising inventory and the advertising demand contracts including:
         partitioning the supply nodes into two or more supply partitions, wherein each supply partition includes one or more supply nodes,
         determining whether each supply node within the supply partitions is eligible for each demand node,
         determining a number of eligible supply nodes to be drawn from each supply partition for each demand node, and
         generating a sub-graph for each supply partition, wherein no more than a portion of each of the sub-graphs is stored in the memory.

2. The method of claim 1, wherein upon determining that a first supply node is eligible for a first demand node, identifying the first supply node as eligible for the first demand node.

3. The method of claim 1, wherein upon determining that a first supply node is eligible for a first demand node, identifying the first supply node as not eligible for the first demand node.

4. The method of claim 1, further comprising:
   connecting edges from supply nodes within a first supply partition to a first demand node.

5. The method of claim 1, where determining the number of eligible supply nodes to be drawn from each supply partition for each demand node includes counting edges connected from the first supply partition to the first demand node.

6. The method of claim 1, further comprising:
   presenting supply nodes, demand nodes, and edges for each demand node; and
   storing no more than the supply nodes, the demand nodes, and the edges for one demand node in a memory.

7. A non-transitory computer-readable medium containing executable instructions stored thereon, which, when executed in a computer, cause the computer to produce an optimization graph in an online advertising system, the instructions for:
   presenting a supply of advertising inventory and advertising demand contracts, wherein each advertising inventory is presented as a supply node and each advertising demand contract is presented as a demand node; and
   processing the supply of advertising inventory and the advertising demand contracts including:
   partitioning the supply nodes into two or more supply partitions, wherein each supply partition includes one or more supply nodes,
   determining whether each supply node within the supply partitions is eligible for each demand node,
   determining a number of eligible supply nodes to be drawn from each supply partition for each demand node, and
   generating a sub-graph for each supply partition, wherein no more than a portion of each of the sub-graphs is stored in a memory.

8. The non-transitory computer readable medium of claim 7, wherein upon determining that a first supply node is eligible for a first demand node, identifying the first supply node as eligible for the first demand node.

9. The non-transitory computer readable medium of claim 7, wherein upon determining that a first supply node is eligible for a first demand node, identifying the first supply node as not eligible for the first demand node.

10. The non-transitory computer readable medium of claim 7, the instruction further for connecting edges from supply nodes within a first supply partition to a first demand node.

11. The non-transitory computer readable medium of claim 7, where determining the number of eligible supply nodes to be drawn from each supply partition for each demand node includes counting edges connected from the first supply partition to the first demand node.

12. The non-transitory computer readable medium of claim 7, the instructions further for presenting supply nodes, demand nodes, and edges for each demand node and for storing no more than the supply nodes, the demand nodes, and the edges for one demand node in a memory.

13. A system to produce an optimization graph in an online advertising system, the system comprising:
   at least one web server, comprising at least one processor and memory, to present a supply of advertising inventory and advertising demand contracts, wherein each advertising inventory is presented as a supply node and each advertising demand contract is presented as a demand node; and a processor and matching platform, comprising at least one processor and a memory, coupled to the web server to partition the supply nodes into two or more supply partitions, wherein each supply partition includes one or more supply nodes, to determine whether each supply node within the supply partitions is eligible for each demand node, to determine a number of eligible supply nodes to be drawn from each supply partition for each demand node, and to generate a sub-graph for each supply partition, wherein no more than a portion of each of the sub-graphs is stored in the memory.

14. The system of claim 13, wherein upon determining that a first supply node is eligible for a first demand node, identifying the first supply node as eligible for the first demand node.

15. The system of claim 13, wherein upon determining that a first supply node is eligible for a first demand node, identifying the first supply node as not eligible for the first demand node.

16. The system of claim 13, the processing and matching platform further to connecting edges from supply nodes within a first supply partition to a first demand node.

17. The system of claim 16, where determining the number of eligible supply nodes to be drawn from each supply partition for each demand node includes counting edges connected from the first supply partition to the first demand node.

18. The system of claim 17, the processing and matching platform further for presenting supply nodes, demand nodes, and edges for each demand node and for storing no more than the supply nodes, the demand nodes, and the edges for one demand node in a memory.

* * * * *

UNITED STATES PATENT AND TRADEMARK OFFICE
CERTIFICATE OF CORRECTION

PATENT NO. : 8,896,604 B2  
APPLICATION NO. : 12/697166  
DATED : November 25, 2014  
INVENTOR(S) : Sumanth Jagannath et al.

Page 1 of 1

It is certified that error appears in the above-identified patent and that said Letters Patent is hereby corrected as shown below:

On the title page item (75),

The third inventor's name should appear as follows:
Jayavel Shanmugasundaram

Signed and Sealed this
Fourteenth Day of April, 2015

Michelle K. Lee
*Director of the United States Patent and Trademark Office*